United States Patent
Philbrick et al.

(10) Patent No.: US 11,531,786 B1
(45) Date of Patent: Dec. 20, 2022

(54) KEYLOGGER DETECTION SYSTEMS AND METHODS

(71) Applicant: United Services Automobile Association (USAA), San Antonio, TX (US)

(72) Inventors: Ashley Raine Philbrick, San Antonio, TX (US); Ryan Thomas Russell, The Colony, TX (US); David Joaquin Harris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/109,942

(22) Filed: Dec. 2, 2020

Related U.S. Application Data

(60) Provisional application No. 62/942,548, filed on Dec. 2, 2019.

(51) Int. Cl.
*G06F 21/83* (2013.01)
*G06F 21/55* (2013.01)
*G06F 21/71* (2013.01)

(52) U.S. Cl.
CPC ............ *G06F 21/83* (2013.01); *G06F 21/552* (2013.01); *G06F 21/71* (2013.01); *G06F 2221/031* (2013.01)

(58) Field of Classification Search
CPC ........ G06F 21/83; G06F 21/552; G06F 21/71; G06F 2221/031
See application file for complete search history.

(56) References Cited

U.S. PATENT DOCUMENTS

| | | | |
|---|---|---|---|
| 2007/0240215 A1* | 10/2007 | Flores ................... | G06F 21/566 726/24 |
| 2009/0254994 A1* | 10/2009 | Waterson .............. | H04L 63/145 719/321 |
| 2016/0098561 A1* | 4/2016 | Keller ................... | G06F 21/566 726/24 |

OTHER PUBLICATIONS

John V. Monaco; SoK Keylogging Side Channels; 2018 IEEE Symposium on Security and Privacy (SP) (pp. 211-228); (Year: 2018).*

(Continued)

*Primary Examiner* — Luu T Pham
*Assistant Examiner* — Chao Wang
(74) *Attorney, Agent, or Firm* — Fletcher Yoder, P.C.

(57) ABSTRACT

A method may include detecting a keylogger based at least in part on an increase in power drawn by an input device, detecting the keylogger based at least in part on a driver of the input device, detecting the keylogger based at least in part on a duration of time that a signal generated by the input device takes to transmit to a computing device, or any combination thereof. The method may also include, in response to detecting the keylogger, generating an alert to indicate a presence of the keylogger.

17 Claims, 3 Drawing Sheets

(56) References Cited

OTHER PUBLICATIONS

Seth Simms, Margot Maxwell, Sara Johnson, Julian Rrushi; Keylogger Detection Using a Decoy Keyboard; Data and Applications Security and Privacy XXXI pp. 433-452; (Year: 2017).*
Herbert Bos Fabian Monrose Gregory Blanc; Research in Attacks, Intrusions, and Defenses; 18th International Symposium, RAID 2015 Kyoto, Japan, Nov. 2-4, 2015 Proceedings; (Year: 2015).*
John V. Monaco; SoK: Keylogging Side Channels; 2018 IEEE Symposium on Security and Privacy; (Year: 2018).*
Nithin Murali • Kumar Appaiah; Keyboard Side Channel Attacks on Smartphones Using Sensor Fusion; 2018 IEEE Global Communications Conference (GLOBECOM) (pp. 206-212); (Year: 2018).*

* cited by examiner

KEYLOGGER DETECTION SYSTEMS AND METHODS

CROSS-REFERENCE TO RELATED APPLICATION

The present disclosure is related to, and claims priority to, U.S. Provisional Application No. 62/942,548, entitled "Security Sharing Systems and Methods," which was filed on Dec. 2, 2019, and which is herein incorporated by reference in its entirety for all purposes.

BACKGROUND

The present disclosure generally relates to computing device monitoring, and more particularly, security systems designed to monitor for unauthorized data sharing.

Computing devices increasingly are connected to other devices, such as other computing devices, memories, servers, or the like, through wireless and/or wired communication networks. As popularity of computing devices has grown to become indispensable, an amount of sensitive data shared through the communication networks has increased. When an unauthorized entity accesses the sensitive data, a security breach may occur and result in a "data leak," or a release of sensitive data as part of an unauthorized access of the sensitive data. Sensitive data may include social security numbers, personal identification numbers, financial information, credit or debit card information, banking information, login credentials for website portals, or the like. Different techniques may be used by an unauthorized party to access the sensitive data stored and/or transmitted by a computing device, such as key logging techniques, phishing methods, viruses, or the like. For example, key logging techniques may retrieve sensitive data through user inputs via an input device, such as a keyboard, of a computing device and keyloggers remain troublesome to detect when monitoring the computing device.

SUMMARY

Certain embodiments commensurate in scope with the originally claimed subject matter are summarized below. These embodiments are not intended to limit the scope of the claims, but rather these embodiments are intended only to provide a brief summary of possible forms of the invention. Indeed, the present disclosure may encompass a variety of forms that may be similar to or different from the embodiments set forth below.

In an embodiment, a system may include an input device and a computing device including a keylogger detection system. The keylogger detection system may perform operations including detecting a keylogger based at least in part on an increase in power drawn by the input device, detecting the keylogger based at least in part on a driver of the input device, detecting the keylogger based at least in part on a duration of time that a signal generated by the input device takes to transmit to the computing device, or any combination thereof. In response to detecting the keylogger, the keylogger detection system may generate an alert that includes a notification associated with the detection of the keylogger.

In another embodiment, a method may include A method may include detecting a keylogger based at least in part on an increase in power drawn by an input device, detecting the keylogger based at least in part on a driver of the input device, detecting the keylogger based at least in part on a duration of time that a signal generated by the input device takes to transmit to a computing device, or any combination thereof. The method may also include, in response to detecting the keylogger, generating an alert to indicate a presence of the keylogger.

In yet another embodiment, a tangible, non-transitory computer-readable medium that stores instructions executable by a processor of an electronic device that, when executed by the processor, cause a computing device to perform operations including detecting a keylogger based at least in part on an increase in power drawn by an input device, detecting the keylogger based at least in part on a driver of the input device, detecting the keylogger based at least in part on a duration of time that a signal generated by the input device takes to transmit to the computing device, or any combination thereof. The operations may also include generating an alert including a notification associated with the detection of the keylogger in response to detecting the keylogger.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
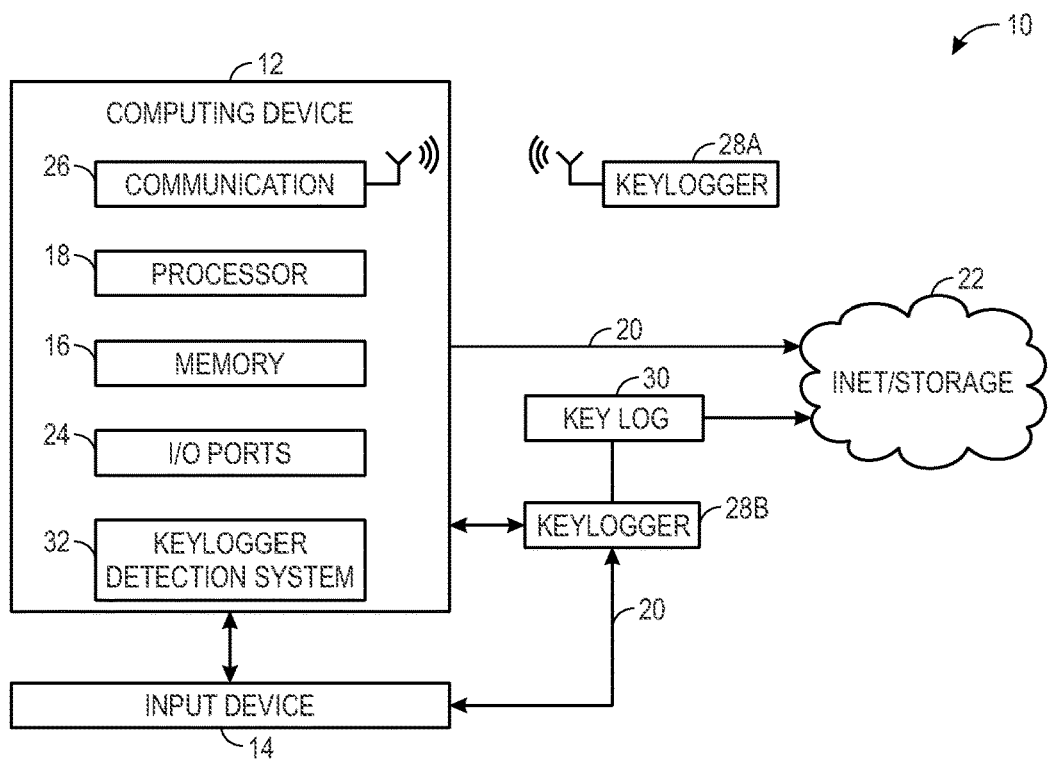
FIG. 1 is a block diagram of example keyloggers monitoring a computing device and/or input device, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Home and business owners may use computing devices, such as cellular phones, laptops, smart devices, or the like, to conduct personal or work-related operations. These computing devices may store sensitive information (e.g., sensitive data of one or more users and/or customers) and/or receive sensitive information via input devices coupled to the computing device. For example, an operator of the computing device may enter personal information via the input device for use with one or more processing operations of the computing device. The computing device may couple to a communication network (e.g., wired network, wireless network) and may transmit the sensitive information via the communication network. Although sensitive information handled by a computing device may appear secure, monitoring techniques exist that enable an unauthorized computing device (e.g., a computing device belonging to an unauthorized operator) access to the sensitive information. For example, an unauthorized operator may use keylogging devices (e.g., keylogger) and/or phishing techniques to access the sensitive information. Improved detection and/or mitigation systems and methods may be desired to improve techniques to thwart unauthorized access to the sensitive information.

In general, keylogging devices are difficult to detect. However, historical or expected operations of an input device and/or of a computing device may be used to detect when a keylogger may be present. For example, the computing device may detect when a driver of the input device is an untrusted driver (e.g., is changed or replaced to a less suitable driver), when an input from the input device takes longer than expected to arrive at the computing device, and/or when the input device draws additional power from the computing device. The computing device may detect the presence of a keylogger when these listed situations occur since the keylogger may cause a detectable deviation in operation from an expected operation.

Identifying the keylogger based at least in part on driver detection operations may involve the computing device pinpointing untrusted drivers. In one embodiment, the computing device may be tasked with recording information corresponding to the driver used by an input device over time as an expected driver (e.g., expected driver properties). When the computing device receives a driver described by one or more properties (e.g., parameters) that deviate from the expected driver, the computing device may determine that a keylogger is present that caused the change. The driver may deviate from the expected driver when one or more driver properties are not the same as a previous driver, when the driver includes additional properties or information, and/or when the driver is associated with different parties from a previous driver and/or from a trusted driver, when other devices of the computing system are unexpectedly activated in conjunction with the driver operations, or the like. In particular, the computing device may monitor properties including a driver provider property, a digital signature property, a driver version property, a copyright owner property, driver files, or the like, to determine when the driver is adjusted in an unexpected manner. The computing device may compare the driver to an expected driver using information retrieved from a database including information associating the input device to the expected driver, and/or may compare the driver to a previous driver for the input device to identify what properties of the driver changed. When the computing device detects that a driver of the input device is changed or replaced with the driver, the computing device may determine that the change was caused by a keylogger, and may alert an operator about the keylogger.

In some cases, the computing device may use an additional or alternative method to detect the keylogger. For example, the computing device may detect when an input from the input device takes longer than expected to arrive at the computing device. The computing device may listen for an audible output from the input device and track a duration of time between detecting the audible output and receiving the input from the input device. The computing device may store an indication of the duration of time into memory as an expected duration of time, and reference the indication when determining whether a second duration of time corresponds to the expected duration of time of transmission and processing of the input. When transmission and processing takes longer than the duration of time, the computing devices corresponds this to the presence of a keylogger, since the keylogger may delay transmission/processing of the input. In some instances, a processing context of the computing device may be used to set the timing thresholds that may indicate a keylogger presence. For example, when a computing device has a relatively high processing load (e.g., high processor and/or memory utilization, a threshold amount of a processing load), there may be a relatively higher processing time for processing user inputs. Thus, the threshold timing that may indicate the presence of a keylogger or other middle-man processing may be dynamically increased based upon this processing context. For example, the computing device may sense a first processing load associated with processing times of its processor and compare the first processing to a second processing load indicative of performance of processing times of the processor over time. The computing device may detect the keylogger based at least in part on determining that the first processing load is a threshold amount greater than the second processing load (e.g., the first processing load takes at least a threshold amount of time to process an input).

Furthermore, in some cases, the computing device may detect a keylogger in response to an amount of power drawn by the input device increasing relative to previous amounts of power drawn. When a keylogger is installed to read and record inputs into the computing device from the input device, the keylogger may use electrical signals to power recording and/or monitoring operations. The keylogger may take these electrical signals from the input device. The keylogger consuming power transmitted to the input device for its operations may increase an amount of power used by the input device. This change in power used by the input device may manifest as a power change at a power supply terminal of the computing device. For example, an amount of voltage at the power supply terminal may drop when the keylogger is to be powered from the same power supply as the input device. Thus, the computing device may sense when the power drawn by the input device changes and may, in response, determine that a keylogger is present.

Keeping the forgoing in mind, FIG. 1 is an illustration of an embodiment of a computing system 10 that includes a computing device 12. The computing device 12 may be coupled to an input device 14 and may receive signals from the input device 14, where the signals are indicative of a user input, such as a key stroke, a mouse click, or the like. Instructions may be stored in a memory 16. A processor 18 may retrieve instructions and execute the instructions to cause the computing device 12 to perform operations, such as processing the user input and/or performing an operation in response to the user input.

The processor 18 may include processing circuitry used to run programs, execute instructions, interpret inputs, generate control signals, and/or other similar functions. For example, the processor 18 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 18 may even, in some embodiments, include multiple processors.

The memory 16 may include any suitable article of manufacture that serves as media to store processor-executable code, data, or the like. The memory 16 may store processor-executable code used by the processor 18 to perform the presently disclosed techniques. Data may be transmitted between components of the computing system 10 via a communication network 20 to internet and/or storage 22. The computing device 12 may couple to the communication network 20 through any number of input/output (I/O) ports 24. The I/O ports 24 may include or be associated with any suitable Universal Serial Bus (USB) port, registered jack port (e.g., RJ15, RJ11, or the like), any sort of antenna to receive wireless signals, user input devices (e.g., keyboards, mouse, or the like), or the like. In this way, the I/O ports 24 may be any suitable input and/or output device that permits data packets to be transmitted into the computing device 34 and/or that permits data packets to be transmitted from the computing device 34.

Additionally or alternatively, the computing device 12 may include communication circuitry 26 to communicate via the communication network 20, and thus may include I/O interfaces and/or network interfaces. The communication circuitry 26 may sometimes include processing circuitry to prepare data for transmission through the communication network 20 and/or to prepare data for use by the computing device 12, such as by performing format changing to the data. The communication network 20 and/or the internet and/or storage 22 may include any number of input/output (I/O) ports or interfaces and/or network interfaces, despite not being expressly depicted in FIG. 1. Such a communication network 20 may enable data transmission over a variety of wired or wireless networks between components of the computing system 10. The wired or wireless networks may include networks such as a personal area network (PAN), BLUETOOTH®, a local area network (LAN) or wireless local area network (WLAN), such as WI-FI®, and/or for a wide area network (WAN), such as a cellular network, near-field communication technologies, mobile telecommunications technology (e.g., 2G, 3G, 4G, 5G, long term evolution (LTE)), ultra-wide band wireless radio technology, or the like. The communication circuitry 26 may include a network interface to enable communication via various protocols such as ETHERNET/IP®, CONTROL-NET®, DEVICENET®, or any other suitable communication network protocol. It is noted that the computing device 12 may include additional or fewer components as those depicted in FIG. 1. For example, the computing device 12 may omit memory 16 and instead use the data stores shared with additional computing devices.

As described, the computing device 12 may handle data. In some cases, the data handled by the computing device 12 is sensitive data. Sensitive data may be data that should not be publically disclosed and/or is related to private information of an operator of the computing device, of customers of a business, of a business, or the like. For example, an operator of the computing device 12 may input, via the input device 14, social security numbers, birthdates, address information, credit card, passwords, financial information, or the like, into the computing device 12 for use and/or storage in the computing device 12. Unauthorized computing devices may use techniques to access the sensitive data inputted to, stored on, and/or handled by the computing devices 12. For example, an unauthorized operator may use a keylogger 28 to access and store the sensitive information.

The keylogger 28 may perform key stroke logging of inputs into the computing device 12. In this way, the keylogger 28 may record particular inputs (e.g., the keys struck) on an input device 14 (e.g., a keyboard) to obtain an unauthorized copy of sensitive data. When the input device 14 is a keyboard (e.g., a mechanical keyboard and/or a software-based touch keyboard), keys of the keyboard may be pressed. Keys of the keyboard may be disposed on an upper surface of the keyboard, and a key may be pressed into the keyboard for registration as a key stroke.

The keylogger 28 may record the key strokes in a key log 30. Data is retrieved from the key log 30, and sometimes the data includes sensitive data handled by the computing device 12. In some embodiments, the keylogger 28 processes the raw key stroke data to generate interpretable data and/or to recreate the data, and may transmit the processed key stroke data as part of the key log 30. The keylogger 28 may use wireless communication techniques to intercept key strokes transmitted between the input device 14 and the computing device 12 (e.g., keylogger 28A). However, in some cases, the keylogger 28 may use wired communication techniques to intercept the key strokes (e.g., keylogger 28B). In some cases, software of the computing device 12 (e.g., an installed driver) may be used to intercept the key strokes (e.g., keylogger 28C).

In general, the keylogger 28 aims to be operationally undetected to an operator of the computing device 12. However, using the current techniques, historical or expected operations of the input device 14 and/or of the computing device 12 may be used to detect when a keylogger 28 is present. In particular, the computing device 12 may include a keylogger detection system 32 that uses deviations from an expected operation of the input device 14 and/or computing device 12 to identify when a keylogger 28 is likely present. For example, the computing device 12 may detect when a driver of the input device 14 is untrusted (e.g., is changed from and/or replaces a trusted driver), when an input from the input device 14 takes longer than expected to arrive at the computing device 12, and/or when the input device 14 draws additional power from the computing device 12. The keylogging detection system 32 may include any suitable combination of hardware and/or software to detect the keylogger 28.

Figure 2:
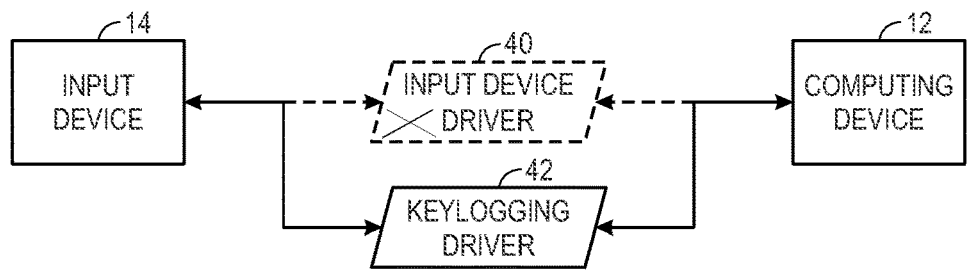
FIG. 2 is a block diagram of the computing device of FIG. 1 receiving a driver from one of the keyloggers of FIG. 1 and using the driver to detect the keylogger, in accordance with embodiments of the present disclosure.

To elaborate, FIG. 2 is a block diagram of the computing device 12 receiving (instead of an input device driver 40 from the input device 14) a keylogging driver 42 from the keyloggers 28. A driver or a device driver may be a computer program that operates or controls a particular type of device communicative coupled to a computing device 12. For example, the input device 14 may correspond to the input device driver 40 and may, according to the input device driver 40, perform authorized operations. However, the keylogging driver 42 may be used to alter or spoof the input device driver 40 as a way to record key strokes received by the computing device 12 from the input device 14. As shown in FIG. 2, the keylogging driver 42 may replace the input device driver 40. However, in some cases, the keylogger 28 may include information in a file transmitted as the input device driver 40 to include program information of the keylogging driver 42. The keylogging driver 42 is transmitted with the intent to program the computing device 12 to interface with the keylogger 28 and to permit the keylogger 28 to record information transmitted from the input device 14 to the computing device 12.

In some instances, the keylogger detection system 32 may detect the keylogger 28 based at least in part on the keylogging driver 42. Indeed, the keylogging driver 42 may be different from a trusted input device driver 40. Thus, the keylogger detection system 32 may monitor and/or record information associated with the trusted input device driver 40 such that the keylogger detection system 32 may detect when one or more properties are different between the keylogging driver 42 and the trusted input device driver 40. In this way, when the keylogger detection system 32 identifies a driver (e.g., the keylogging driver 42) that deviates from an expected driver (e.g., the input device driver 40), the keylogger detection system 32 may determine that the keylogger 28 may be present, as indicated by the change in driver properties. It is noted that in some cases, the keylogging driver 42 is the keylogger 28 implemented as a program in software, and thus may record key strokes of the input device 14 and/or process the key strokes.

The keylogger detection system 32 may monitor driver properties that are used to define or identify the driver files, such as a driver provider property, a digital signature property, a driver version property, a copyright owner property, driver files, or the like, to determine when a trusted input device driver 40 is adjusted in an unexpected manner (e.g., replaced by the keylogging driver 42). The keylogger detection system 32 may store an indication of particular driver property criteria to be met (e.g., expected driver properties) for trusted drivers 40 of a particular input device 14. The expected driver properties may be transmitted explicitly to the keylogger detection system 32 and/or may be determined over time, such as by the keylogger detection system 32 monitoring driver properties of a suitably operating input device 14. In some embodiments, the keylogger detection system 32 may track properties over time (e.g., in a historical property log) and, using historical analysis, determine when properties change. In this way, the keylogger detection system 32 may use driver parameter data indicative of the expected or normal driver properties or expected or normal behaviors for the input device 14 to establish an expected driver for the input device 14. The driver parameter data may be indicative of the trusted driver/trusted driver parameters and may be retrieved from a database that includes information associating the input device 14 to the trusted driver (e.g., input device driver 40 and/or a subset of driver parameters of the input device driver 40). At reception of the keylogging driver 42, the keylogger detection system 32 may retrieve the driver parameter data of the input device driver 40 and compare data of the keylogging driver 42 to the driver parameter data of the input device driver 40 to identify which parameters, if any, of the driver for the input device 14 changed. When the keylogger detection system 32 detects that a driver of the input device 14 changed or was replaced by the keylogging driver 42, the keylogger detection system 32 may determine that the change is indicative of a keylogger 28. The keylogger detection system 32 may generate an alert in response to detecting that the input device driver 40 was replaced by the key logging driver 42, and may alert an operator about the keylogger 28 and/or or about a likelihood of a presence of the keylogger 28. In some embodiments, the alert may trigger a corrective operation to be performed, such as triggering an installation of a new, trusted driver 40 to replace the unauthorized driver (e.g., keylogging driver 42), and/or powering off of the device such that sensitive information is not continued to be transmitted. The likelihood of the presence of the keylogger 28 may be related to a number of properties changed and/or particular properties that changed to known malicious properties. For example, the likelihood of existence of a keylogger 28 may increase as a number of properties that deviate from expected driver increases. Further, in some instances, particular properties may be known to indicate a malicious key logging driver, such as properties indicated by third-party as indicating a malicious key logging driver.

Figure 3:
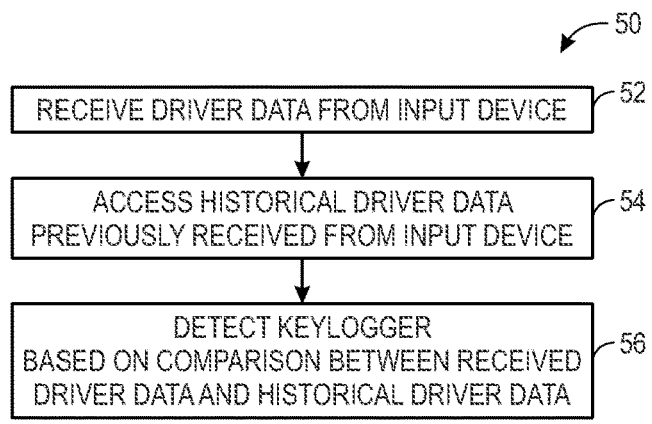
FIG. 3 is a flowchart of a first method for detecting at least one of the keyloggers of FIG. 1, in accordance with embodiments of the present disclosure.

FIG. 3 is a flowchart of a first method 50 for detecting the keylogger 28 using the drivers 40, 42. Although described as performed by the keylogger detection system 32, it should be understood that any suitable computing device and/or portion of the computing device 12 may perform, or facilitate performing, the method 50. It should be understood that although the method 50 is presented in a particular order, any suitable order of operations may be used to perform the method 50. Furthermore, it should be understood that some or all of the performance of operations of the method 50 may be facilitated by a processor executing instructions stored on a tangible, non-transitory memory or storage device (e.g., such as a processor 18 executing instructions stored in the memory 16).

With the above in mind, at block 52, the keylogger detection system 32 may receive driver data (e.g., keylogging driver 42 corresponding to driver parameters) from the input device 14. When the keylogger detection system 32 receives driver data, the keylogger detection system 32 may access historical driver data and compare the driver data to the historical driver data. The keylogger detection system 32 may compare the driver data to previously received driver parameters to determine whether the driver data is a change from previously received drivers. When driver parameters of the received driver data are different from historical driver data and/or otherwise expected driver data, the keylogger detection system 32 may identify that a keylogger 38 is present and/or is recording key strokes of the input device 14. In some cases, the keylogger detection system 32 may perform an additional check on driver parameters of the received driver data that are different from historical driver data. In particular, the keylogger detection system 32 may compare driver parameters determined to be different than expected driver parameters against a database of driver parameters known to be malicious and/or belong to unauthorized systems, companies, operators, or the like. The database of driver parameters may be maintained by a third-party and be accessible by the keylogger detection system 32. This additional check may help to identify authorized changes to input device drivers 40 and unauthorized changes to input device drivers 40.

In some embodiments, processes and/or device activities correlated with usage of the driver 42 may be used to identify keylogging drivers 42. For example, in some instances, a pattern between activities of the keylogging drivers 42 and other drivers or hardware of the computing device may be identified. For example, for every 250 registered inputs by the keylogging drivers 42, a write to a Universal Serial Bus (USB) device or a transmission via a network radio occurs. These patterns may be indicative of transmission of keylogging data. Thus, in some instances, driver/hardware correlation patterns may be used to identify keylogging drivers 42.

Figure 4:
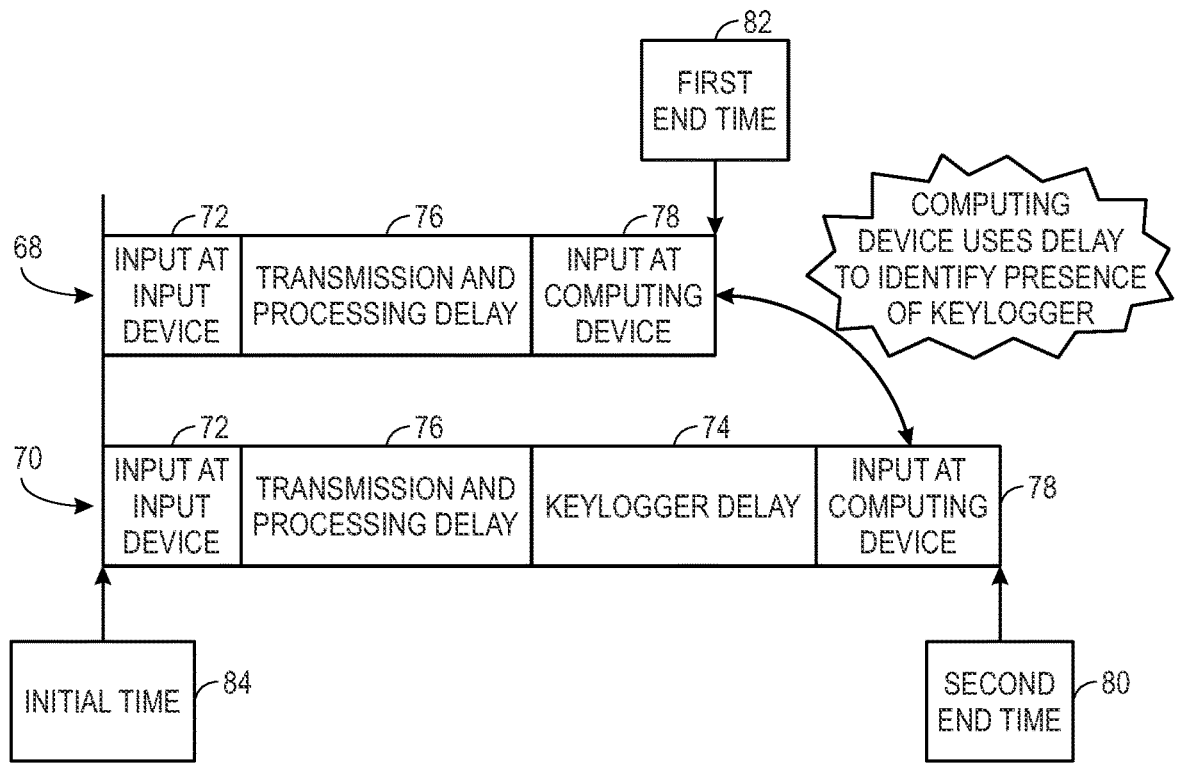
FIG. 4 is a timing diagram representing the computing device of FIG. 1 detecting at least one of the keyloggers of FIG. 1 based at least in part on a delay in expected transmission/processing time, in accordance with embodiments of the present disclosure.

Additionally or alternatively to detecting keyloggers 28 based at least in part on device drivers, the keylogger detection system 32 may use transmission/processing times of an input from the input device 14 to detect the keylogger 28. To elaborate, FIG. 4 is a timing diagram representing the computing device 12 detecting the keylogger 28 based at least in part on a delay in expected transmission/processing time between an expected timeline 68 and a delayed timeline 70 (e.g., a delay exceeding a threshold amount of time). The delayed timeline 70 may be relatively longer than the expected timeline 68. The delayed timeline 70 may represent a relatively longer duration of time since an input received at the input device (e.g., represented by input duration 72) may incur delay when handled by a keylogger 28 (e.g., keylogger delay duration 72), such as for unauthorized recordation of the input or transmission of the input to the internet and/or storage 22.

For the expected timeline 68, the input may be received at the input device 14 (input duration 72). The input duration 72 may correspond to a total time of a key stroke (e.g., pressing a key on a keyboard), a duration of time between an initiation of a key stroke and initiation of a transmission of the data corresponding to the key stroke, or the like. The duration of time corresponding to the key stroke such that the computing device 12 may identify the input as a key stroke may correspond to a transmission/processing delay duration 76. An amount of time to receive the input at the computing device 12 and/or identify the input as a key stroke may correspond to input duration 78. Many of the durations of time used to transmit the input from the input device 14 to the computing device 12 may be the same or substantially similar. However, the keylogger delay duration 74 may increase an overall duration of the delayed timeline 70 such that the delayed timeline 70 ends at an end time 80 relatively later than an end time 82 of the expected timeline 68, despite having a same initial start time 84. The keylogger detection system 32 may leverage a detected change in durations of input transmissions to identify a presence of the keylogger 28. For example, the keylogger detection system 32 may listen for a physical actuation of a key on a keyboard (e.g., the input device 14), record as a first time a time corresponding to the physical actuation, and determine when the input from the keyboard is received at the computing device 12, and record as a second time a time corresponding to a time the input is received at the computing device 12. It is noted that in some embodiments, the keylogger detection system 32 may receive an indication of the first time from the input device 14 in addition to or alternate of listening for an actuation of a key on a keyboard. When there is no keylogger 28, the time difference between the first time and the second time may correspond to the expected timeline 68. However, when there is a keylogger 28, the time difference between the first time and the second time may correspond to the delayed timeline 70. The keylogger detection system 32 may identify when the time difference changes and use the change to identify a presence of the keylogger 28.

As mentioned above, the transmission/processing delay duration 76 may not always be consistent. For example, under certain low processing volume conditions, the transmission/processing delay duration 76 may be relatively smaller than under higher processing volume conditions. Thus, the expected transmission/processing delay duration 76 may dynamically shift based upon a processing context of the computing device.

Figure 5:
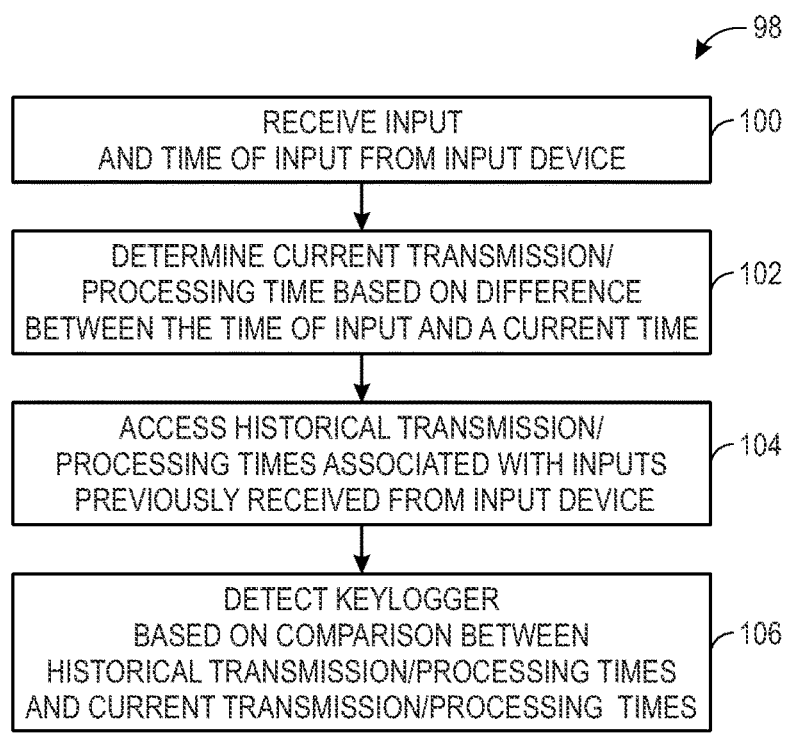
FIG. 5 is a flowchart of a second method for detecting at least one of the keyloggers of FIG. 1, in accordance with embodiments of the present disclosure.

To elaborate on the techniques for identifying keyloggers based upon transmission/processing delays, FIG. 5 is a flowchart of a second method 98 for detecting the keylogger 28 using difference in transmission/processing delays, as described in FIG. 4. Although described as performed by the keylogger detection system 32, it should be understood that any suitable computing device and/or portion of the computing device 12 may perform, or facilitate performing, the method 98. It should be understood that although the method 98 is presented in a particular order, any suitable order of operations may be used to perform the method 98. Furthermore, it should be understood that some or all of the performance of operations of the method 98 may be facilitated by a processor executing instructions stored on a tangible, non-transitory memory or storage device (e.g., such as a processor 18 executing instructions stored in the memory 16).

At block 100, the keylogger detection system 32 may receive an input from the input device 14 and/or a time of input from the input device 14. The keylogger detection system 32 may directly receive, from the input device 14, a time associated with the input from the input device 14. In some cases, the keylogger detection system 32 may communicatively couple to a microphone (e.g., a microphone sensing device coupled to the computing device 12 via the I/O ports 54). The microphone may generate output data in response to a nearby audible sound, such as a key press. When the input from the microphone is determined to correspond to the key press, the keylogger detection system 32 may record a time corresponding to the sensing of the key press by the microphone to be a time that the key of the keyboard was pressed.

At block 102, the keylogger detection system 32 may determine a current transmission/processing duration based on a difference between the time that the key of the keyboard was pressed and a current time. This duration of time may correspond to a length of time between start times 84 and end time 80, when there is a keylogger 28, or end time 82, when there is not a keylogger 28.

At block 104, the keylogger detection system 32 may access historical transmission times associated with inputs previously received from the input device 14. The historical transmission times may be used by the keylogger detection system 32 to identify a trend or an expected duration of time to take an input to travel from the input device 14 to the computing system 12. The trends may account for a processing context observed during the timing events. Thus, trends can be calculated for any granularity of processing context.

The trend or expected duration of time may be used by the keylogger detection system 32 to identify when a transmission of an input took a duration of time longer than what is normal or expected. In some embodiments, the length of time of the transmission is compared to a previous transmission to verify whether the current transmission took relatively more time.

In this way, at block 106, the keylogger detection system 32 may detect the presence of the keylogger detection system 32 in response to a comparison between the expected transmission/processing duration and a current transmission/processing duration resulting in identifying that the current transmission/processing duration is longer than the expected transmission/processing duration. The keylogger detection system 32 may attribute the increased transmission/processing duration to a keylogger delay duration 74, and may thus identify the presence of the keylogger 28 in response to the attribution.

Figure 6:
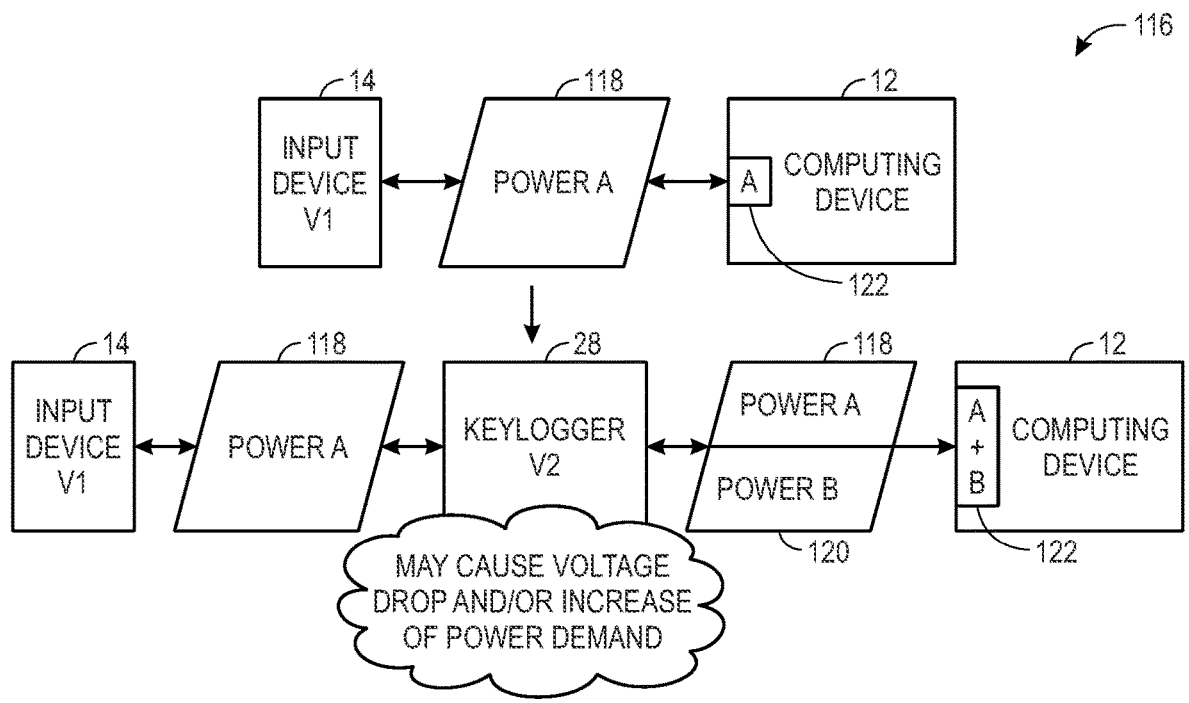
FIG. 6 is a block diagram of the computing device of FIG. 1 detecting at least one of the keyloggers of FIG. 1 based at least in part on a detected change in power drawn by the input device of FIG. 1, in accordance with embodiments of the present disclosure.

Additionally or alternatively to detecting keyloggers 28 based at least in part on device drivers and/or transmission/processing times, the keylogger detection system 32 may monitor an amount of power drawn by the input device 14 to identify a presence of a keylogger 28. To elaborate, FIG. 6 is a block diagram of the computing device 12 detecting the keylogger 28 based at least in part on a detected change in an amount of power drawn by the input device 14 (e.g., a detected change in the amount of power drawn being greater than a threshold amount). As shown, before a keylogger 28 is included between the input device 14 and the computing device 12, the input device 14 may draw a first amount of power 118 (e.g., power A) from the computing device 12. However, after inclusion of the keylogger 28, an amount of power drawn by both the keylogger 28 and the input device 14 may increase since the keylogger 28 draws a second amount of power 120 from the computing device 12.

Electrical signals may be provided to the input device 14 via a supply terminal 122 of the computing device 12. Before the keylogger 28 is installed between the input device 14 and the computing device 12, the supply terminal 122 provides the first amount of power 118 to the input device 14. After the keylogger 28 is installed, the supply terminal 122 provides the first amount of power 118 and the second amount of power 120 to the input device 14. The keylogger detection system 32 may sense when the change in amount of power supplied to the input device via the supply terminal 122 changes and may, in response to the change, identify a presence of the keylogger 28. In some cases, a voltage of the supply terminal 122 relative to a reference voltage and/or a ground voltage (e.g., 0 volts) may change, such as decrease, in response to the keylogger 28 being installed between the input device 14 and the computing device 12.

Figure 7:
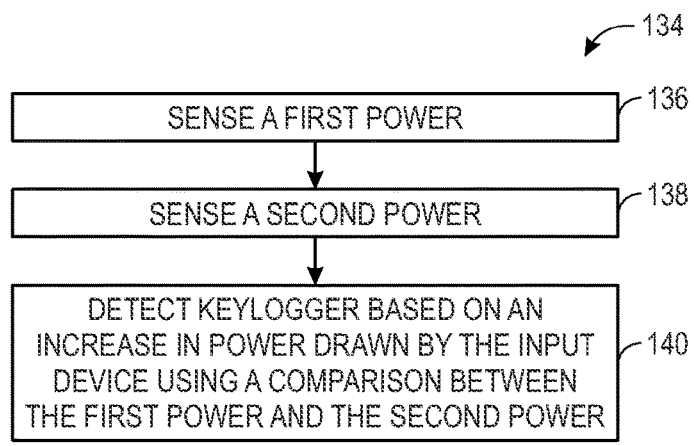
FIG. 7 is a flowchart of a third example method for detecting at least one of the keyloggers of FIG. 1, in accordance with embodiments of the present disclosure.

To elaborate on how the keylogger detection system 32 may detect the keylogger 28, FIG. 7 is a flowchart of a third method 134 for detecting the keylogger 28 using difference changes in power drawn by the input device 14, as described in FIG. 6. Although described as performed by the keylogger detection system 32, it should be understood that any suitable computing device and/or portion of the computing device 12 may perform, or facilitate performing, the method 134. It should be understood that although the method 134 is presented in a particular order, any suitable order of operations may be used to perform the method 134. Furthermore, it should be understood that some or all of the performance of operations of the method 134 may be facilitated by a processor executing instructions stored on a tangible, non-transitory memory or storage device (e.g., such as a processor 18 executing instructions stored in the memory 16).

At block 136, the keylogger detection system 32 may sense a first amount of power. The first amount of power sensed by the keylogger detection system 32 may correspond to the first amount of power 118 drawn by the input device 14 before being affected by the keylogger 28. At a later time, the amount of power sensed by the keylogger detection system 32 may change. Thus, at a second time, at block 138, the keylogger detection system 32 may sense a second amount of power. The second amount of power sensed may correspond to the first amount of power 118 and the second amount of power 120 discussed with regard to FIG. 6. The addition of the keylogger 28 may increase power drawn by the input device 14 by an amount to be used in operating the keylogger 28.

At block 140, the keylogger detection system 32 may detect the presence of the keylogger 28 based at least in part on identifying the change in power drawn by the input device 14 from the first amount of power to the second amount of power. A keylogger 28 may increase power drawn from the supply terminal 112 by adjusting an amount of voltage and/or an amount of current drawn by the input device 14. Thus, the keylogger detection system 32 may detect the keylogger 28 in response to detecting a threshold amount of increase in the amount of power drawn from the supply terminal 112, detecting a threshold amount of change in the amount of voltage drawn from the supply terminal, and/or detecting a change in the amount of current drawn from the supply terminal.

For each of the methods 50, 98, and 134, the keylogger detection system 32 may detect the keylogger 28 and, in response to detecting the keylogger 28, another system of the computing device 12 and/or the keylogger detection system 32 may perform an operation. For example, the keylogger detection system 32 may initiate a generation of a notification in the form of an image to be displayed on a display of the computing device 12 (e.g., a pop-up notification), in the form of an email to be transmitted on behalf of an operator of the computing device 12, in the form of a maintenance request transmitted to an operator to be addressed, or the like.

In some embodiments, the computing device 12 may combine methods described with FIGS. 1-7. For example, the computing device 12 may use the methods in combination with assigned likelihoods to determine how likely a keylogger 28 is monitoring the computing device 12 based on a particular behavior of the input device 14 as identified by the computing device 12. The computing device may use methods of FIG. 3, FIG. 5, and/or FIG. 7 to assign a first likelihood to a first behavior pattern of the input device 14, and subsequent methods to increase a likelihood assigned to the first behavior pattern. For example, the computing device 12 may set a first likelihood after identifying that the input device driver 40 of the input device 14 changed and may increase the likelihood to a second value of likelihood after determining that, for the input device 14, an amount of power consumed by the input device 14 changed.

Thus, technical effects of the present disclosure include techniques for improved monitoring systems. These techniques describe systems and methods for detecting keylogging devices that may otherwise be undetectable by a computing system and/or an operator of a computing system. The computing device may include a keylogger detection system. The keylogger detection system may detect when a driver of the input device is changed or replaced, when an input from the input device takes longer than expected to arrive at the computing device, and/or when the input device draws additional power from the computing device. By improving detection methods used to detect keylogging devices, operation of the computing device may improve by permitting a computing device to automatically detect and counteract The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    an input device;
    a microphone configured to detect a sound associated with a key press; and
    a computing device comprising a keylogger detection system, wherein the keylogger detection system comprises a processor configured to perform operations comprising
    recording a first time that the microphone detects the sound associated with the key press;
    identifying a second time that a signal generated by the input device, in response to the key press, is received by the computing device;
    identifying a duration of time between the first time and the second time as a transmission time of the key press;
    detecting a keylogger based at least in part on:
        an increase in the transmission time of the key press in comparison to a historical trend of transmission times that it has taken signals generated by the input device to transmit to the computing device, and
        the duration of time that the signal generated by the input device takes to transmit to the computing device by:
        receiving the signal generated by the input device at a current time and a time of input into the input device from the input device;
        determining the duration of time based at least in part on a difference between the time of input and the current time;
        accessing historical transmission times associated with previous signals received from the input device; and
        detecting the keylogger based at least in part on determining that the duration of time is a threshold amount longer than one or more historical transmission times; and
    in response to detecting the keylogger, generating an alert comprising a notification associated with the detection of the keylogger.

2. The system of claim 1, wherein the processor is configured to perform the operations comprising detecting the keylogger based at least in part on the increase in power drawn by the input device by:
    sensing a first amount of power drawn in conjunction with the input device;
    sensing a second amount of power drawn in conjunction with the input device;
    determining that the second amount of power is a threshold amount greater than the first amount of power; and
    detecting the keylogger based at least in part upon the second amount of power being a threshold amount greater than the first amount of power.

3. The system of claim 2, wherein the first amount of power is sensed at a supply terminal coupling the input device to the computing device.

4. The system of claim 1, wherein the processor is configured to perform the operations comprising detecting the keylogger based at least in part on a driver received from the input device by:
    receiving a driver parameter of the driver;
    accessing an expected driver parameter;
    determining that the driver parameter is different from the expected driver parameter; and
    detecting the keylogger based at least in part upon determining that the driver parameter is different from the expected driver parameter.

5. The system of claim 4, wherein the processor is configured to perform the operations comprising:
    determining the expected driver parameter based at least in part on historical driver information corresponding to the input device.

6. The system of claim 4, wherein the processor is configured to perform the operations comprising:
    determining a likelihood that the driver corresponds to the keylogger;
    comparing the driver parameter to a list of parameters determined at an earlier time to correspond to the keylogger; and
    increasing the likelihood in response to determining that the list of parameters comprises the driver parameter.

7. The system of claim 1, wherein the processor is configured to perform the operations comprising receiving the signal generated by the input device at the current time and the time of input into the input device from the input device comprises:
    listening for an audible key press into the input device; and
    recording a time associated with the audible key press as the time of input into the input device, wherein the audible key press is transmitted from the input device, and wherein the signal comprises an indication resulting from the audible key press into the input device.

8. A method for operating a keylogger detection system of a computing device, comprising:
    detecting, via a microphone, a sound associated with a key press;
    recording a first time the microphone detects the sound associated with the key press;
    identifying a second time that a signal is generated by an input device in response to the key press is received by the computing device;
    identifying a duration of time between the first time and the second time as a transmission time of the key press;
    detecting a keylogger based at least in part on:
        an increase in the transmission time of the key press in comparison to a historical trend of transmission times that it has taken signals generated by the input device to transmit to the computing device, and
        the duration of time that the signal generated by the input device takes to transmit to the computing device by:
        receiving the signal generated by the input device at a current time and a time of input into the input device from the input device;
        determining the duration of time based at least in part on a difference between the time of input and the current time;

accessing historical transmission times associated with previous signals received from the input device; and detecting the keylogger based at least in part on determining that the duration of time is a threshold amount longer than one or more historical transmission times; and in response to detecting the keylogger, generating an alert comprising a notification associated with the detection of the keylogger.

9. The method of claim 8, wherein detecting the keylogger based at least in part on the increase in power drawn by the input device comprises:

sensing a first amount of power at a terminal coupling the computing device to the input device, wherein the first amount of power is drawn in conjunction with the input device;

sensing a second amount of power at the terminal drawn in conjunction with the input device;

determining that the second amount of power is a threshold amount greater than the first amount of power; and detecting the keylogger based at least in part upon the second amount of power being a threshold amount greater than the first amount of power.

10. The method of claim 8, wherein detecting the keylogger based at least in part on a driver of the input device comprises:

receiving a driver parameter of the driver;

accessing an expected driver parameter;

determining that the driver parameter is different from the expected driver parameter; and detecting the keylogger based at least in part upon determining that the driver parameter is different from the expected driver parameter.

11. The method of claim 10, comprising:

determining a likelihood that the driver corresponds to the keylogger;

comparing the driver parameter to a list of parameters determined at an earlier time to correspond to the keylogger; and increasing the likelihood in response to determining that the list of parameters comprises the driver parameter.

12. A tangible, non-transitory computer-readable medium configured to store instructions executable by a processor of an electronic device that, when executed by the processor, cause a computing device to perform operations comprising:

recording a first time a microphone detects a sound associated with a key press;

identifying a second time a signal is generated by an input device in response to the key press is received by the computing device;

identifying a duration of time between the first time and the second time as a transmission time of the key press;

detecting a keylogger based at least in part on:

an increase in the transmission time of the key press in comparison to a historical trend of transmission times that it has taken signals generated by the input device to transmit to the computing device, and the duration of time that the signal generated by the input device takes to transmit to the computing device by:

receiving the signal generated by the input device at a current time and a time of input into the input device from the input device;

determining the duration of time based at least in part on a difference between the time of input and the current time;

accessing historical transmission times associated with previous signals received from the input device; and detecting the keylogger based at least in part on determining that the duration of time is a threshold amount longer than one or more historical transmission times; and in response to detecting the keylogger, generating an alert comprising a notification associated with the detection of the keylogger.

13. The non-transitory computer-readable medium of claim 12, the operations comprising:

sensing the increase in power drawn in conjunction with the input device;

generating a first likelihood in response to sensing the increase in power drawn in conjunction with the input device;

determining that one or more properties of a driver changed from one or more previous driver properties; and increasing a value of the first likelihood to a second likelihood in response to determining that a threshold amount of the one or more properties of the driver changed.

14. The non-transitory computer-readable medium of claim 12, the operations comprising:

sensing the increase in power drawn in conjunction with the input device;

generating a first likelihood in response to sensing the increase in power drawn in conjunction with the input device;

determining that the duration of time that the signal generated by the input device takes to transmit to the computing device is greater than a previous duration of time corresponding to an earlier signal transmission between the input device and the computing device; and increasing a value of the first likelihood to a second likelihood in response to determining that the duration of time is a threshold amount greater than the previous duration of time.

15. The non-transitory computer-readable medium of claim 12, comprising detecting the keylogger based at least in part on a duration of time that the signal generated by the input device takes to transmit to the computing device include operations comprising:

sensing a first processing load at least in part on processing times of the processor;

comparing the first processing load to a second processing load, wherein the second processing load is indicative of performance of the processing times of processor over time; and detecting the keylogger based at least in part on determining that the first processing load is a threshold amount greater than the second processing load.

16. The non-transitory computer-readable medium of claim 12, comprising detecting the keylogger based at least in part on a driver of the input device include operations comprising:

receiving a driver parameter of the driver;

accessing an expected driver parameter;

determining that the driver parameter is different from the expected driver parameter; and detecting the keylogger based at least in part upon determining that the driver parameter is different from the expected driver parameter.

17. The non-transitory computer-readable medium of claim 16, the operations comprising:

determining a likelihood that the driver corresponds to the keylogger;

comparing the driver parameter to a list of parameters determined at an earlier time to correspond to the keylogger; and increasing the likelihood in response to determining that the list of parameters comprises the driver parameter.

\* \* \* \* \*